(12) United States Patent
Tsai et al.

(10) Patent No.: US 7,685,339 B2
(45) Date of Patent: Mar. 23, 2010

(54) REMOTE CONTROL SYSTEM AND METHOD THEREOF

(75) Inventors: Wei-Chin Tsai, Hsinchu (TW); Yun-Fuh Yeh, Hsinchu (TW); Hais-Heng Liu, Shanghai (CN); Jun Zheng, Shanghai (CN); Wen-Fang Yan, Shanghai (CN)

(73) Assignee: Arcadyan Technology Corporation, Hsinchu (TW)

( * ) Notice: Subject to any disclaimer, the term of this patent is extended or adjusted under 35 U.S.C. 154(b) by 0 days.

(21) Appl. No.: 11/846,538

(22) Filed: Aug. 29, 2007

(65) Prior Publication Data

US 2008/0282011 A1 Nov. 13, 2008

(30) Foreign Application Priority Data

May 9, 2007 (TW) ................ 96116472 A

(51) Int. Cl.
*G06F 13/12* (2006.01)
*G06F 13/38* (2006.01)

(52) U.S. Cl. .......................... 710/62; 710/63
(58) Field of Classification Search ................ 710/62, 710/63
See application file for complete search history.

(56) References Cited

U.S. PATENT DOCUMENTS

| | | | |
|---|---|---|---|
| 6,904,489 B2 * | 6/2005 | Zarns | 710/315 |
| 2004/0090984 A1 * | 5/2004 | Saint-Hilaire et al. | 370/463 |
| 2006/0142991 A1 * | 6/2006 | Sajwani et al. | 703/25 |
| 2006/0143314 A1 * | 6/2006 | Sinha et al. | 710/5 |
| 2007/0071034 A1 * | 3/2007 | Fleming | 370/474 |
| 2007/0074174 A1 * | 3/2007 | Thornton | 717/127 |
| 2008/0005432 A1 * | 1/2008 | Kagawa | 710/106 |
| 2008/0028120 A1 * | 1/2008 | McLeod | 710/313 |
| 2008/0126653 A1 * | 5/2008 | King et al. | 710/300 |
| 2008/0256459 A1 * | 10/2008 | Sekiya | 715/741 |

* cited by examiner

*Primary Examiner*—Alford W Kindred
*Assistant Examiner*—David E Martinez
(74) *Attorney, Agent, or Firm*—Jianq Chyun IP Office

(57) ABSTRACT

A remote control system and a method thereof are provided. The remote control system includes a first host, an adapter, and a peripheral device. The first host converts a first serial signal into a first network packet, and then outputs the first network packet through a network. The adapter is connected to the network to receive the first network packet, and then converts the first network packet into a second serial signal complying with a universal serial bus (USB) format. The peripheral device is coupled to the adapter through the USB, and receives the second serial signal, so that the user can control the peripheral device at a remote site through the network.

12 Claims, 5 Drawing Sheets

REMOTE CONTROL SYSTEM AND METHOD THEREOF

CROSS-REFERENCE TO RELATED APPLICATION

This application claims the priority benefit of Taiwan application serial no. 96116472, filed May 9, 2007. All disclosure of the Taiwan application is incorporated herein by reference.

BACKGROUND OF THE INVENTION

1. Field of the Invention

The present invention relates to a remote control system and a method thereof. More particularly, the present invention relates to a system and a method thereof for remote controlling a peripheral device having a USB through a network.

2. Description of Related Art

Universal serial bus (USB) is a widely used connection interface, and computer peripheral devices can be connected with a desktop computer, a notebook computer, and a personal digital assistant (PDA) through the USB. Furthermore, since the USB has a characteristic of hot-plug, it is convenient for the user to add or remove the peripheral devices freely Therefore, the USB interface has been widely applied in the peripheral devices including, for example, keyboards, mice, network cards, and printers. Currently, the application of the USB includes connecting the peripheral device to a USB interface of the computer directly by using a USB transmission cable, such that instructions and data can be transmitted between the computer and the peripheral device through the transmission cable.

However, when the distance between the peripheral device and the computer which will be connected by a user is long or exceeds the distance of the transmission cable, thus user must move the computer close to the peripheral device or move the peripheral device close to the computer, which causes troubles to the user in using the USB, and even worse, the user may not connect the computer to the peripheral device.

Furthermore, if two computers share one peripheral device at the same time, after one computer uses the peripheral device, the user must detach the transmission cables connected to the peripheral device first, and then connect the peripheral device to another computer with the transmission cables, so that another computer continues to use the peripheral device. Therefore, when more than two computers need to share the same peripheral device, the user must manually connect the transmission cables among different computers, which causes inconveniences in use.

SUMMARY OF THE INVENTION

The present invention provides a remote control system, for converting a serial signal into a network packet through an adapter, and transmitting the network packet to a remote host, so that a peripheral device receives or transmits data through a network, and the user can use the peripheral device at a remote site.

The present invention provides a remote control method, for converting a USB signal into a network packet through an adapter, so as to not using a USB transmission cable to transmit data, and thus the host used by the user is not limited by the length of the transmission cable, and can be conveniently connected to the peripheral device at a remote site through the network to transmit data.

A remote control system including a first host, an adapter, and a peripheral device is provided. The first host converts a first serial signal into a first network packet, and then outputs the first network packet through a network. The adapter connected to the network receives the first network packet, and the adapter has a USB, and converts the first network packet into a second serial signal complying with a USB format. The peripheral device having the USB is coupled to the adapter through the USB and receives a second serial signal.

The present invention further provides a remote control method, for transmitting a first serial signal between a first host and a peripheral device. First, the first serial signal is converted into a first network packet by the first host, and the first network packet is transmitted through a network. Then, an adapter connected to the network is provided and the adapter is used to convert the first network packet into a second serial signal complying with the USB format and output it to the peripheral device.

The present invention converts a USB signal into a network packet through an adapter, so that the peripheral device receives data or transmits data to a host through the network, so as to not using a USB transmission cable to transmit data, and thus the host used by the user can be connected to a peripheral device at a remote site, and the user can use the peripheral device conveniently.

In order to make the aforementioned and other objectives, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
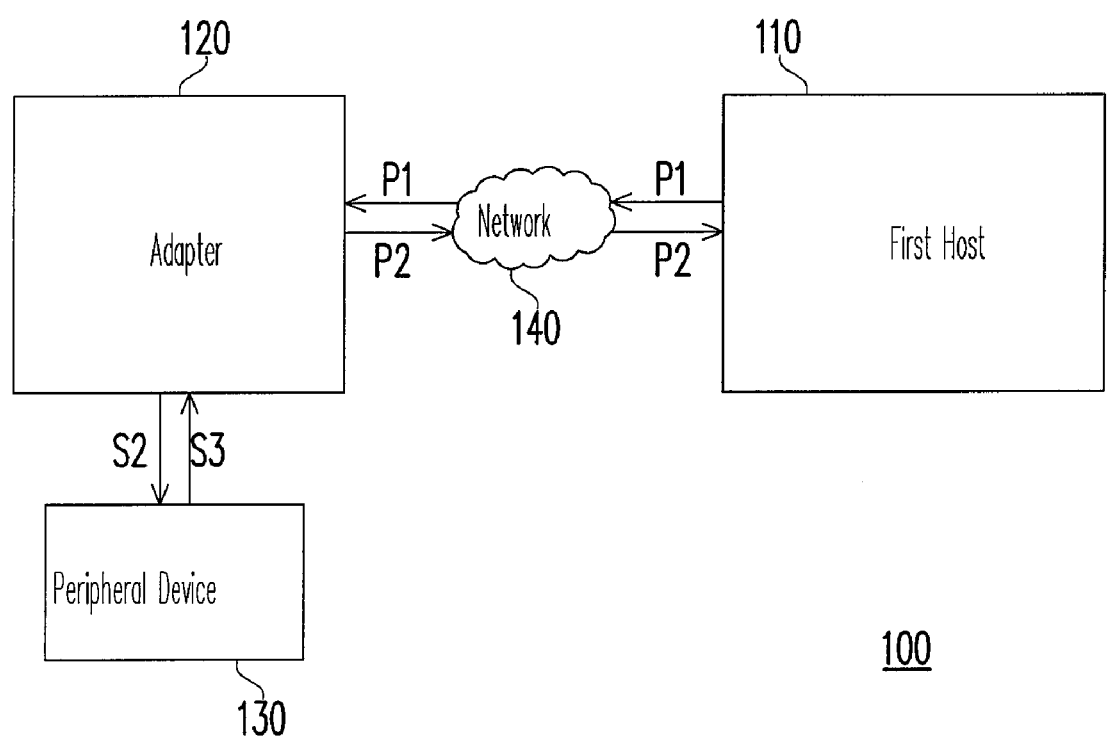
FIG. 1 is a block diagram of a remote control system according to an embodiment of the present invention.

FIG. 1 is a block diagram of a remote control system according to an embodiment of the present invention. Referring to FIG. 1, the remote control system 100 of the present invention includes a first host 110, an adapter 120, a peripheral device 130, and a network 140. The first host 110 and the adapter 120 are both connected to the network 140, and a network packet is transmitted between the first host 110 and the adapter 120 through the network 140. The adapter 120 and the peripheral device 130 each have a USB interface, such that the data is transmitted through the USB interface. Moreover, the adapter 120 provided by the embodiment of the present invention is used to convert the format of the data, so that the data can be transmitted under different protocols. That is to say, the adapter 120 can convert a network packet into a serial signal complying with the USB, and can also convert the serial signal into a network packet.

Furthermore, in this embodiment, the first host 110 is a desktop computer, a notebook computer, a personal digital assistant (PDA), and so on. The peripheral Io device 130 is a portable drive, a printer, or another computer peripheral device having a USB. The adapter 120 is a gateway or another device capable of converting data format.

Figure 2:
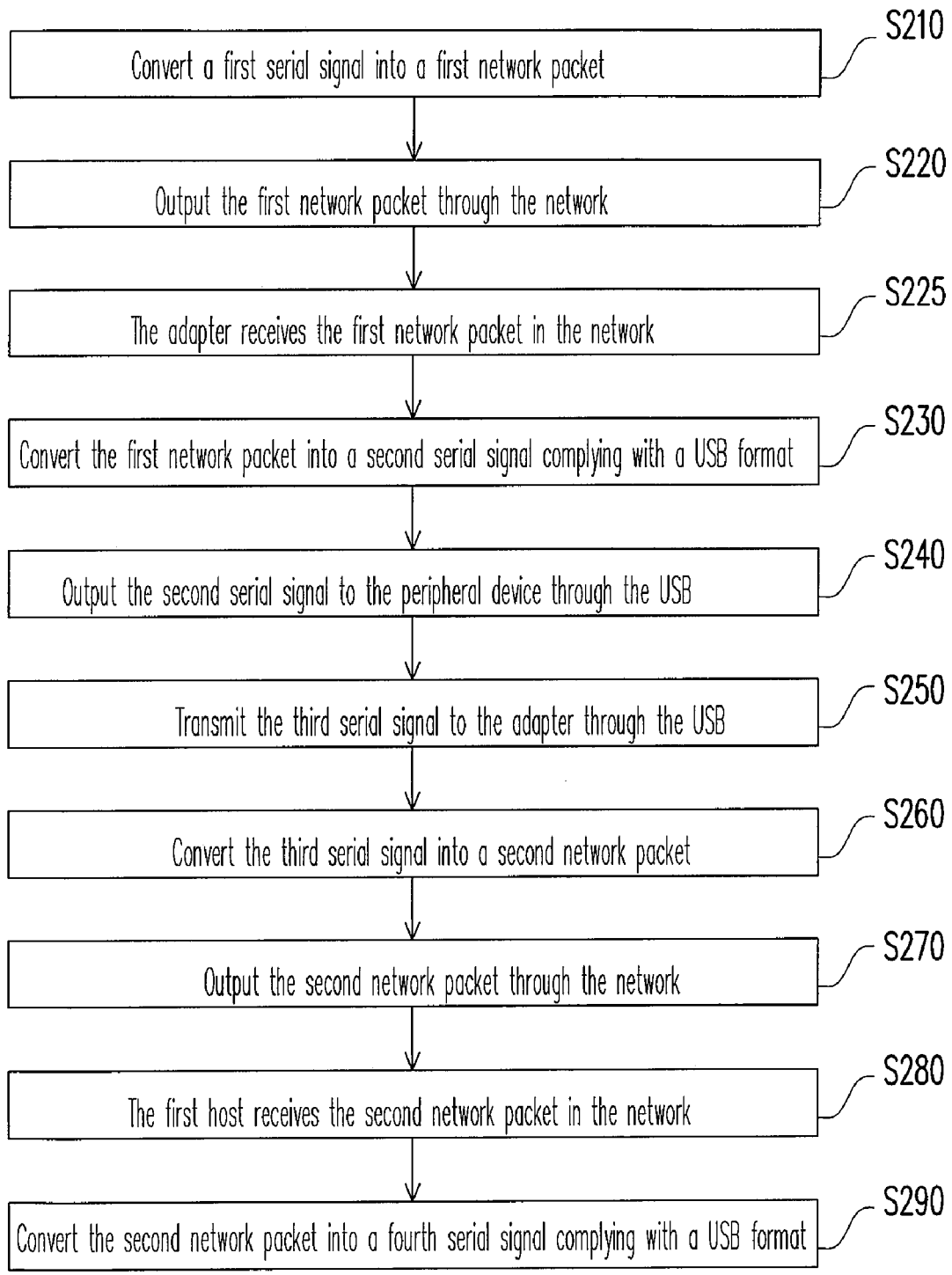
FIG. 2 is a flow chart of steps of a remote control method according to an embodiment of the present invention.

When the user connects the peripheral device 130 to the adapter 120 through the USB, the first host 110 is connected to the adapter 120 through the network 140, and connected to the peripheral device 130 through the adapter 120, so as to access the data in the peripheral device 130, such that the first host 110 can remote control the peripheral device 130. Hereinafter, the remote control method according to an embodiment of the present invention is illustrated with the elements in FIG. 1. FIG. 2 is a flow chart of steps of a remote control method according to an embodiment of the present invention. Referring to FIGS. 1 and 2, how to use the elements in FIG. 1 to transmit data between the first host 110 and the peripheral device 130 is illustrated.

First, when the first host 110 intends to control the peripheral device 130, a first serial signal S1 is first transmitted to the peripheral device 130. Then, the first host 110 converts a first serial signal S1 into a first network packet P1 (Step S210), and outputs the first network packet P1 through the network 140 (Step S220).

The adapter 120 connected to the network 140 receives the first network packet P1 output by the first host 110 from the network (Step S225), and converts the first network packet P1 into a second serial signal S2 complying with the USB format (Step S230), and then outputs the second serial signal S2 to the peripheral device 130 through a USB interface (Step S240), such that the peripheral device 130 receives the data to be transmitted by the first host 110 originally. In this embodiment, since the operating systems of the first host 110 and the adapter 120 are different, the first serial signal S1 to be transmitted by the first host 110 and the second serial signal S2 received by the peripheral device 130 are serial signals having the same data but not necessarily in the same format.

When the peripheral device 130 receives the data transmitted from the first host 110, a third serial signal S3 is transmitted to the first host 110. Then, the peripheral device 130 firstly transmits the third serial signal S3 to the adapter 120 through a USB (Step S250). The adapter 120 after receives the third serial signal S3 converts the third serial signal S3 into a second network packet P2 (Step S260), and then outputs the second network packet P2 through the network 140 (Step S270).

Then, the first host 110 receives the second network packet P2 output from the adapter 120 through the network 140 (Step S280). Finally, the first host 110 converts the received second network packet P2 into a fourth serial signal S4 complying with the USB format (Step S290), so as to obtain the data to be transmitted by the peripheral device 130 originally.

It can be known from the above embodiment, when the first host 110 receives the second network packet P2 through the network 140, the second network packet P2 is converted into the fourth serial signal S4 complying with a USB format. However, it can be deduced by persons of ordinary skill in the art that, after the first host 110 receives the second network packet P2 through the network 140, the first host 110 analyzes the second serial signal S2 directly without converting the second network packet P2 into the fourth serial signal S4, and the second network packet P2 extracts the data to be transmitted by the peripheral device 130 originally. Furthermore, it is known from the above embodiment that, the above network 140 can be a network of any type, for example a wired local area network or a wireless local area network.

It should be noted that, in the above embodiment, after the user connects the peripheral device to the adapter, the first host can transmit data to the adapter through the network, and the first host can access the peripheral device directly. The adapter transmits the received data to the peripheral device through a USB interface. Therefore, when the distance between the host and the peripheral device is extremely long or exceeds the length of the transmission cable, the peripheral device can still receive the data of the host through the USB interface, so that the user can use the peripheral device-more conveniently without moving the peripheral device close to the host. Hereinafter, an embodiment of another device is further provided for persons skilled in the art to implement the present invention according to the teaching of the embodiment.

Figure 3:
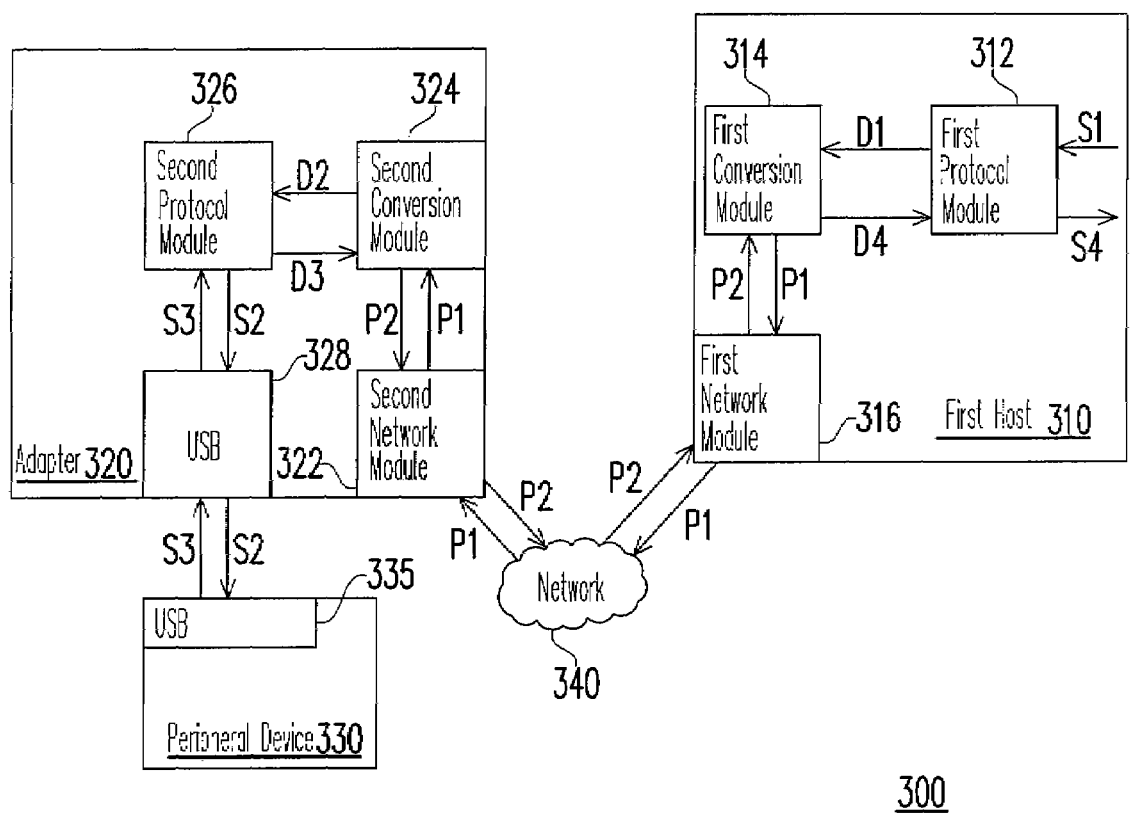
FIG. 3 is a block diagram of a remote control system according to an embodiment of the present invention.

FIG. 3 is a block diagram of a remote control system according to an embodiment of the present invention. Referring to FIG. 3, the remote control system 300 includes a first host 310, an adapter 320, a peripheral device 330, and a network 340. In this embodiment, the first host 110 is a desktop computer, a notebook computer, a personal digital assistant (PDA), and so on. The peripheral device 330 may be a portable drive, a printer, or another computer peripheral device having a USB. The adapter 120 is a gateway or another device capable of converting data format.

For the convenience of illustrating the embodiment of the present invention it is assumed that the first host 310 and the adapter 320 are connected to the network 340. The peripheral device 330 and the adapter 320 each have a USB.

The first host 310 in FIG. 3 further includes a first protocol module 312, a first conversion module 314, and a first network module 316. The adapter 320 includes a second network module 322, a second conversion module 324, a second protocol module 326, and a USB interface 328. The peripheral device 330 also includes a USB interface 335.

When the user connects the peripheral device 330 to the adapter 320 through the USB, the first host 310 can transmit data through the adapter 320 and the peripheral device 330, so as to remote control the peripheral device 330. In this embodiment, if the peripheral device 330 is a printer having a USB, and the user manipulating the first host 310 can transmit the data to be printed to the printer through the adapter 320, and print the transmitted data by the use of the printer. Hereinafter, how to use the elements in FIG. 3 to transmit the data between the first host 310 and the peripheral device 330 is illustrated.

First, when the first host 310 intends to transmit data to the peripheral device 330, the first protocol module 312 in the first host 310 receives a first serial signal S1 transmitted by a front-end element (not shown), determines the data transmission type of the first serial signal S1, and converts the first serial signal S1 into a first data D1 according to the data transmission type. For example, the common USB 2.0 specification has four different data transmission types including control transfer, interrupt transfer, bulk transfer, and isochronous transfer. The first protocol module 312 includes a first USB core driver for identifying the data transmission type of the first serial signal S1 and performing data processing properly.

After receiving the first data D1, the first conversion module 314 converts the first data into a first network packet P1 and transmits it to the first network module 316. The first network module 316 transmits the first network packet P1 to the network 340.

The second network module 322 in the adapter 320 receives the first network packet P1 through the network 340, and outputs the first network packet P1 to the second conversion module 324. After receiving the first network packet P1, the second conversion module 324 converts the first network packet P1 into a second data D2 and output it to the second protocol module 326. The second protocol module 326 converts the second data D2 into a second serial signal S2 complying with the USB format and outputs it to the USB interface 328.

In this embodiment, the above second data D2 is of, for example, the data format specified by the second protocol module 326. The second protocol module 326 for example includes a second USB core driver and a control module. The second USB core driver in the second protocol module 326 is used to identify the data transmission type of the second data D2 (for example, the four different data transmission types in the above USB 2.0 specification), and the control module in the second protocol module 326 converts the second data D2 into a second serial signal S2 according to the data transmission type of the second data D2.

Then, when the USB interface 328 of the adapter 320 receives the second serial signal S2, the second serial signal S2 is output to the USB interface 335 in the peripheral device 330, such that the peripheral device 330 obtains the data transmitted by the first host 310 originally.

On the contrary, when the peripheral device 330 intends to transmit data to the first host 310, the peripheral device 330 transmits a third serial signal S3 to the USB interface 328 in the adapter 320 through the USB interface 335, and the USB interface 328 outputs the third serial signal S3 to the second protocol module 326 in the adapter 320.

After receiving the third serial signal S3, the second protocol module 326 first determines the data transmission type of the third serial signal S3, converts the third serial signal S3 into a third data D3 according to the data transmission type, and outputs it to the second conversion module 324. After the second conversion module 324 converts the third data D3 into a second network packet P2, the second network packet P2 is transmitted to the network 340 through the second network module 322.

Then, the first network module 316 in the first host 310 receives the second network packet P2 from the network 340, and outputs it to the first conversion module 314. The first conversion module 314 converts the second network packet P2 into a fourth data D4, and outputs it to the first protocol module 312. The fourth data D4 is of, for example, a data format specified by the first protocol module 312.

At last, the first protocol module 312 converts the fourth data D4 into a fourth serial signal S4 according to the protocol of the USB, such that the first host 310 obtains data to be transmitted by the peripheral device 330. In this embodiment, since the operating systems of the first host 310 and the adapter 320 may be different, the first serial signal S1 to be transmitted by the first host 310 and the second serial signal S2 received by the peripheral device 330, and the third serial signal S3 to be transmitted by the peripheral device 330 and the fourth serial signal S4 received by the first host 310 are serial signals having the same data but not necessarily in the same format.

It is known from the above embodiment that, in practical application, each module in FIG. 3 can be implemented as hardware in the integrated circuit, or written as a driver, or accomplished by a combined design of hardware and software, and persons of ordinary skill in the art should know that the implementation method is not limited to the above.

Furthermore, in the above embodiment, the first host 310 communicates with the adapter 320 through the network 340, so before the data is transmitted between the first host 310 and the peripheral device 330, a network connection is established between the first host 310 and the adapter 320 for transmitting network packet between the first host 310 and the adapter 320 through the network 340. The method for establishing the network connection involves, for example, using the first conversion module 314 in the first host 310 to transmit a communication request to the second conversion module 324 in the adapter 320 to request for operating the peripheral device 330 coupled to the adapter 320. Then, the second conversion module 324 in the adapter 320 transmits a response message to the first host 310 for informing the first host 310 of starting transmitting data.

In the above embodiment, a plurality of hosts in the network 340 need to use the peripheral device 330 connected to the adapter 320 at the same time, in the embodiment of the present invention, a plurality of hosts in the network 340 still can use the peripheral device 330 by turns. Therefore, the situation that two hosts need to use the peripheral device at the same time is taken as an example to illustrate the way of a plurality of hosts using the peripheral device 330 at the same time.

Figure 4:
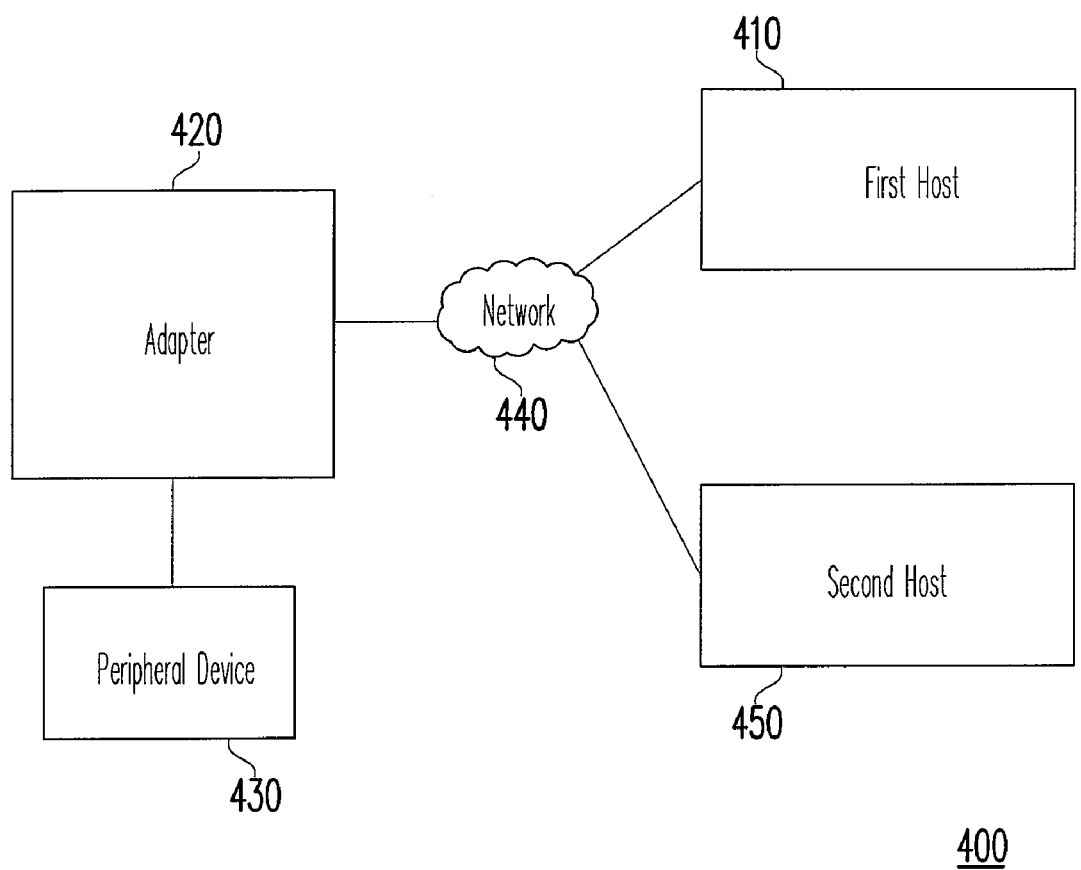
FIG. 4 is a block diagram of a remote control system according to an embodiment of the present invention.
Figure 5:
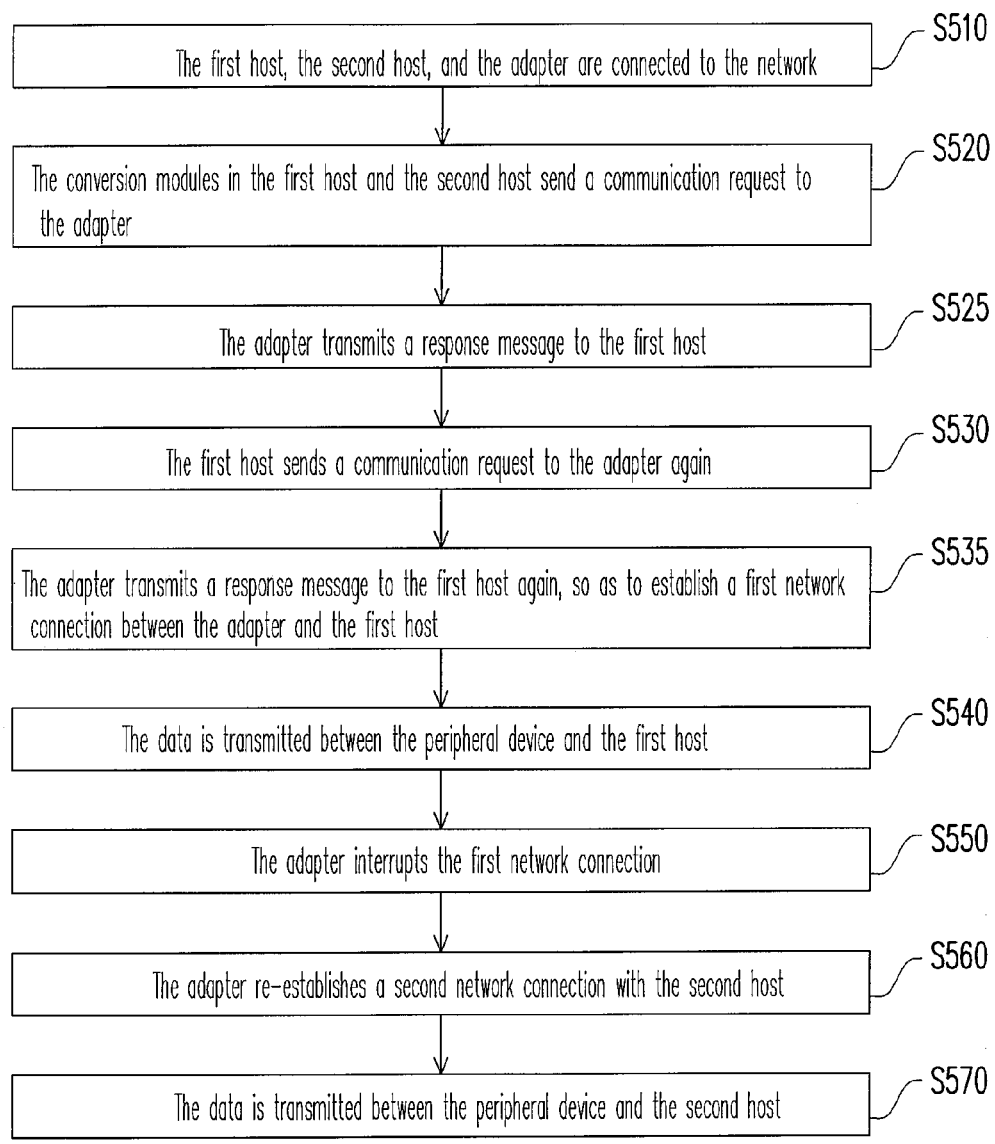
FIG. 5 is a flow chart of steps of a remote control method according to an embodiment of the present invention.

FIG. 4 is a block diagram of a remote control system according to an embodiment of the present invention. FIG. 5 is a flow chart of steps of a remote control method according to an embodiment of the present invention. Referring to FIG. 4, the remote control system 400 includes a first host 410, an adapter 420, a peripheral device 430, a network 440, and a second host 450. The first host 410 and the second host 450 are, for example, the same as the first host 310 in FIG. 3, and the adapter 420 is the same as 320 in FIG. 3, so the details will not be repeated herein.

Then, referring to FIGS. 4 and 5, firstly, the first host 410, the second host 450, and the adapter 420 are all connected to the network 440 (Step S510). Then, the conversion modules in the first host 410 and the second host 450 send a communication request to the adapter 420 (Step S520). That is to say, the first host 410 and the second host 450 need to use the peripheral device 430 at the same time.

Then, the adapter 420 determines to allow the first host 410 or the second host 450 to use the peripheral device 430, and the determination is made, for example, according to the sequence of the adapter 420 receiving the communication request, or made by other methods. Herein, if the adapter 420 determines to allow the first host 410 to use the peripheral device 430, a response message is transmitted to the first host 410 (Step S525). The response message, for example, includes the information of the peripheral device 430 connected to the adapter 420.

Then, the first host 410 after receiving the response message sends a communication request to the adapter 420 again (Step S530), and the adapter 420 transmits a response message to the first host 410 again, so as to establish a first network connection between the adapter 420 and the first host 410 (Step S535), so as to make the peripheral device 430 to be used by the first host 410 only. Then, the data is transmitted between the first host 410 and the peripheral device 430 (Step S540). The details of the steps of transmitting data in Step S540 are for example Steps S210-S290 in FIG. 2, and will not be described herein again.

After the data transmission between the first host 410 and the peripheral device 430 is accomplished, the adapter 420 interrupts the first network connection between the first host 410 and the adapter 420 (Step S550), and re-establishes a second network connection between the second host 450 and the adapter 420 (Step S560), so as to make the peripheral device 430 to be used by the second host 450 only. Then, the data is transmitted between the peripheral device 430 and the second host 450 (Step S570).

It is known from the above steps S510-S570 that, in the embodiment of the present invention, the establishment of the network connection is used to determine the first host 410 or the second host 450 to use the peripheral device 430 by turns. Moreover, the present invention can avoid the conflict in operation when a plurality of hosts uses the peripheral device 430 at the same time. Furthermore, when a plurality of hosts needs to use the peripheral device 430, in the embodiment of the present invention, the peripheral device 430 can be used by different hosts as long as the user establishes the network connection between the adapter 420 and different hosts instead of connecting the transmission cables to different hosts.

Based on the above description, the present invention converts a USB signal into a network packet through an adapter, such that the peripheral device receives or transmits data to a host through a network, so as to avoid using a USB transmission cable to transmit data, and the host used by the user can be connected to a peripheral device at a remote site. Thus, the user can use the peripheral device more conveniently.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A remote control system, comprising:
   a first host, for converting a first serial signal into a first network packet, and outputting the first network packet through a network;
   an adapter, connected to the network, for receiving the first network packet, and the adapter having a universal serial bus (USB), and converting the first network packet into a second serial signal complying with a USB format; and
   a peripheral device, having a USB, coupled to the USB of the adapter through the USB, for receiving the second serial signal;
   wherein the first host establishes a first network connection with the adapter through transmitting a communication request to the adapter, waiting for the adapter to determine whether to allow the first host to use the peripheral device, and receiving a response message transmitted from the adapter to the first host in response to the adapter determining to allow the first host to use the peripheral device.

2. The remote control system as claimed in claim 1, wherein the first host comprises:
   a first protocol module, for converting the first serial signal into a first data and outputting the first data according to a protocol of the USB;
   a first conversion module, for converting the first data into the first network packet; and
   a first network module, for transmitting the first network packet into the network.

3. The remote control system as claimed in claim 2, wherein the first protocol module comprises:
   a first USB core driver, for identifying a data transmission type of the first serial signal, and performing data processing according to the data transmission type of the first serial signal.

4. The remote control system as claimed in claim 2, wherein the adapter comprises:
   a second network module, for receiving the first network packet;
   a second conversion module, for converting the first network packet into a second data; and
   a second protocol module, converting the second data into the second serial signal and outputting the second serial signal according to a protocol of the USB.

5. The remote control system as claimed in claim 4, wherein the second protocol module comprises:
   a second USB core driver, for identifying a data transmission type of the second data, and then performing data processing according to the data transmission type of the second data; and
   a control module, for converting the second data into the second serial signal.

6. The remote control system as claimed in claim 1, wherein the adapter comprises a gateway, wherein the gateway is capable of converting data format.

7. A remote control method, for transmitting a first serial signal between a first host and a peripheral device, the remote control method comprising:
   converting a first serial signal into a first network packet by the first host;
   transmitting the first network packet through a network by the first host;
   providing an adapter connected to the network, wherein the adapter has a universal serial bus (USB);
   receiving the first network packet by the adapter;
   connecting the peripheral device to the USB of the adapter through the USB;
   outputting the second serial signal by the first host to the peripheral device;
   establishing a first network connection with the adapter through transmitting a communication request to the adapter;
   waiting for the adapter to determine whether to allow the first host to use the peripheral device;
   and receiving a response message from the adapter to the first host in response to the adapter determining to allow the first host to use the peripheral device.

8. The remote control method as claimed in claim 7, wherein the step of transmitting the first network packet through a network comprises:
   connecting the first host to the network;
   connecting the adapter to the network;
   providing a first conversion module which is included in the first host;
   providing a second conversion module which is included in the adapter;
   establishing a first network connection between the first host and the adapter through the first conversion module and the second conversion module; and
   transmitting the first network packet through the first network connection.

9. The remote control method as claimed in claim 7, further comprising:
   interrupting the first network connection between the first host and the adapter; and
   establishing a second network connection between a second host and the adapter, for transmitting the data between the second host and the peripheral device.

10. The remote control method as claimed in claim 7, further comprising:
    connecting the peripheral device to the adapter through the USB.

11. The remote control method as claimed in claim 7, when the peripheral device intends to transmit a third serial signal to the first host, comprising:
    outputting the third serial signal to the adapter through a USB;
    converting the third serial signal into a second network packet through the adapter, and outputting the second network packet through the network; and
    using the first host to convert the second network packet to a fourth serial signal complying with the USB format.

12. The remote control method as claimed in claim 7, wherein the adapter comprises a gateway, wherein the gateway is capable of converting data format.

* * * * *